US 6,711,880 B2

United States Patent
Wipf et al.

(10) Patent No.: US 6,711,880 B2
(45) Date of Patent: Mar. 30, 2004

(54) APPARATUS FOR, AND METHOD OF, FEEDING PIECE GOODS TO A TUBULAR-BAG PACKAGING STATION

(75) Inventors: Alfred Wipf, Jestetten (DE); Thomas Strasser, Benken (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 10/138,439

(22) Filed: May 3, 2002

(65) Prior Publication Data

US 2003/0005665 A1 Jan. 9, 2003

(30) Foreign Application Priority Data

May 23, 2001 (CH) .................................. 0961/01

(51) Int. Cl.⁷ .............................................. B65B 9/00
(52) U.S. Cl. ........................................ 53/450; 550/203
(58) Field of Search ............................... 198/437, 444, 198/395, 401; 53/544, 450, 550, 203, 52, 55

(56) References Cited

U.S. PATENT DOCUMENTS

| | | | |
|---|---|---|---|
| 4,663,915 A | | 5/1987 | Van Erden et al. |
| 5,165,219 A | * | 11/1992 | Sekiguchi et al. ............. 53/493 |
| 5,370,216 A | * | 12/1994 | Tsuruyama et al. .......... 198/395 |
| 5,444,964 A | * | 8/1995 | Hanagata ...................... 53/550 |
| 5,551,550 A | * | 9/1996 | Marshall et al. ............. 198/432 |
| 5,661,949 A | * | 9/1997 | Blanc ............................ 53/237 |
| 5,870,882 A | * | 2/1999 | Lowe .......................... 53/381.2 |
| 5,941,052 A | * | 8/1999 | Evangelisti ................... 53/433 |
| 6,520,317 B2 | * | 2/2003 | Sherwin ....................... 198/438 |

FOREIGN PATENT DOCUMENTS

| | | |
|---|---|---|
| CH | 675233 | 9/1990 |
| CH | 675233 A5 | 9/1990 |
| DE | 297 01 564 | 3/1997 |
| EP | 0 439 741 B1 | 3/1995 |
| EP | 0 712 782 | 5/1996 |

OTHER PUBLICATIONS

European Search Report.

* cited by examiner

Primary Examiner—Eugene Kim
(74) Attorney, Agent, or Firm—Harness, Dickey & Pierce, P.L.C.

(57) ABSTRACT

An apparatus for feeding piece goods (P) to a tubular-bag packaging station (4) has a feed conveyer (1) for feeding the piece goods (P) and a packaging-material-web conveyer (5) for conveying the packaging-material web (50) to the packaging station (4). A position-detecting unit (2) serves for detecting the piece goods (P) conveyed on the feed conveyer (1). Furthermore, at least one gripping unit (3) is provided for removing the piece goods (P) from the feed conveyer (1) and for depositing the piece goods (P') directly or indirectly in a predetermined position on the packaging-material web (50), it being possible to convey the piece goods (P') from the packaging-material web (50) to the packaging station (4).

16 Claims, 4 Drawing Sheets

APPARATUS FOR, AND METHOD OF, FEEDING PIECE GOODS TO A TUBULAR-BAG PACKAGING STATION

TECHNICAL FIELD

The invention relates to an apparatus for, and a method of, feeding piece goods to a tubular-bag packaging station.

BACKGROUND OF THE INVENTION

Various such apparatuses are known from the prior art. For example, U.S. Pat. No. 4,663,915 describes a method of, and an apparatus for, packaging cheese in tubular bags. In this case, the cheese is conveyed onto a sheet material by a conveying belt in the immediate vicinity of the packaging station, the sheet material then being processed in the packaging station to form a tubular bag. No description is given of how the cheese is transferred onto the conveying belt. This is generally carried out in the prior art, however, by hand or by means of feed chains with carry-along elements.

CH-A-675,233, furthermore, discloses a method of, and an apparatus for, introducing chocolates fully automatically into containers provided therefor, the containers being conveyed, on a conveying belt, past a charging station. The charging station is provided with an optical position-detecting system, which senses the position of each incoming chocolate. On account of the data determined, a freely programmable gripping apparatus grips the chocolates and positions them in the desired alignment, and at the desired intervals, on a conveying belt. This conveying belt transports the chocolates to an introduction region with a second gripping apparatus, by means of which the chocolates are deposited in the container.

EP-B-0,439,741 discloses a robot for transporting articles in a timesaving manner from a first conveying belt onto a second conveying belt.

SUMMARY OF THE INVENTION

It is an object of the invention is to provide an apparatus for, and a method of, feeding piece goods to a tubular-bag packaging station, which are straightforward and cost-effective but efficient.

This object is achieved by an apparatus and a method having the features of patent claims 1 and 13, respectively.

According to the invention, the piece goods, by means of a position-detecting unit and a gripping unit, are positioned on a packaging-material web from a feed conveyer and, together with this packaging-material web, are conveyed to the packaging station, where the packaging-material web is processed to form a tubular bag.

In a preferred variant, the piece goods are positioned on the packaging-material web directly from the feed conveyer. In another variant, they are positioned in a predetermined position on an intermediate conveyer, which transfers the piece goods in this position to the packaging-material web.

The apparatus according to the invention allows feed chains with carry-along elements to be avoided. This makes it possible to reduce the production costs. In addition, the amount of space required by the installation as a whole is reduced.

The apparatus according to the invention allows a high degree of flexibility as far as the tasks of gripping and conveying the piece goods are concerned.

Furthermore, it makes an increased throughput possible. Further advantageous variants of the method and advantageous embodiments can be gathered from the dependent patent claims.

BRIEF DESCRIPTION OF THE DRAWINGS

The subject matter of the invention is explained herein below with reference to preferred exemplary embodiments, which are illustrated in the attached drawings, in which.

DETAILED DESCRIPTION OF THE PREFERRED EMBODIMENTS

Figure 1:
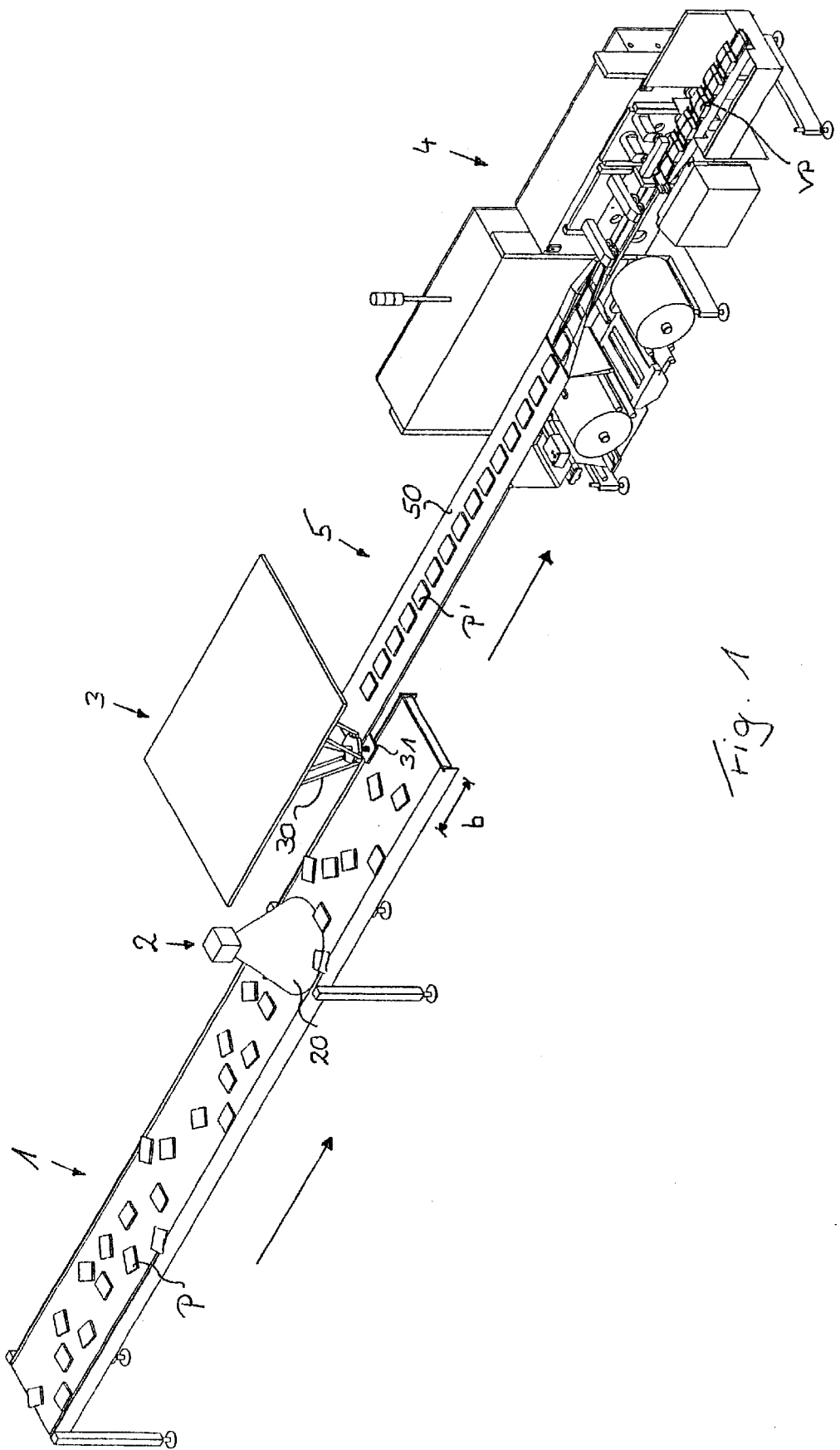
FIG. 1 shows a schematic illustration of a first embodiment of an apparatus according to the invention with a tubular-bag packaging station.

FIG. 1 illustrates a first embodiment of an apparatus according to the invention. It has a feed conveyer 1, which is generally a conveying belt. On this feed conveyer 1, piece goods P are supplied, in random or ordered alignment, from a production location or an intermediate store to a packaging station 4. At least one position-detecting unit 2 is provided in the region of said feed conveyer 1. The one or more position-detecting units 2 have a detection area 20, which at least more or less covers the entire conveying width of the feed conveyer 1. At least one gripping unit 3 is arranged downstream of the at least one position-detecting unit 2 as seen in the conveying direction. If a plurality of gripping units 3 are provided, then they are preferably arranged one behind the other in the conveying direction. The gripping unit 3 is preferably a delta-type robot with a plurality of robot arms 30 and a gripping element 31, for example a suction cup or gripping tongs.

Arranged adjacent to the feed conveyer 1 is a packaging-material-web conveyer 5, which conveys a packaging-material web 50 to the packaging station 4, where the packaging material is processed to form tubular bags. In the example illustrated here, the packaging-material web 50 is a web of sheet material.

According to the invention, the position and alignment of the piece goods P supplied by the feed conveyer 1 are detected by means of the position-detecting unit 2 and, by means of the gripping unit 3, in accordance with the detection, are gripped and positioned in a predetermined position, which is suitable for subsequently forming the tubular bags, directly on the packaging-material web 50. If the piece goods P are supplied in random fashion on the feed conveyer 1, they are put into order and/or grouped. If they are supplied in ordered fashion, they are likewise rearranged and/or grouped in accordance with the packaging method. The now ordered piece goods P', which are transported to the packaging station 4 by the packaging-material web 50, are packaged in the packaging station 4 and leave the latter as packaged products VP. Manual or automatic visual inspection can be carried out on the packaging-material conveyer 5. The packaging-material web 50 here has a high enough coefficient of friction for the piece goods to be transported without slipping.

It is preferable, as illustrated in FIG. 1, for a start of the bearing surface of the packaging-material-web conveyer 5, the start of said surface being directed toward the feed conveyer 1, to be aligned with that end of the bearing surface of the feed conveyer 1 which is directed toward the packaging-material-web conveyer 5. In the exemplary embodiment illustrated here, the packaging-material-web conveyer 5 is offset in relation to the feed conveyer 1 in the direction perpendicular to the conveying direction. It is preferably arranged at least more or less adjacent to the feed conveyer 1 and overlaps the latter along the conveying direction over a section b. This minimizes the transfer distance for the gripping unit 3. The conveying direction is illustrated by an arrow in the figure.

Figure 2:
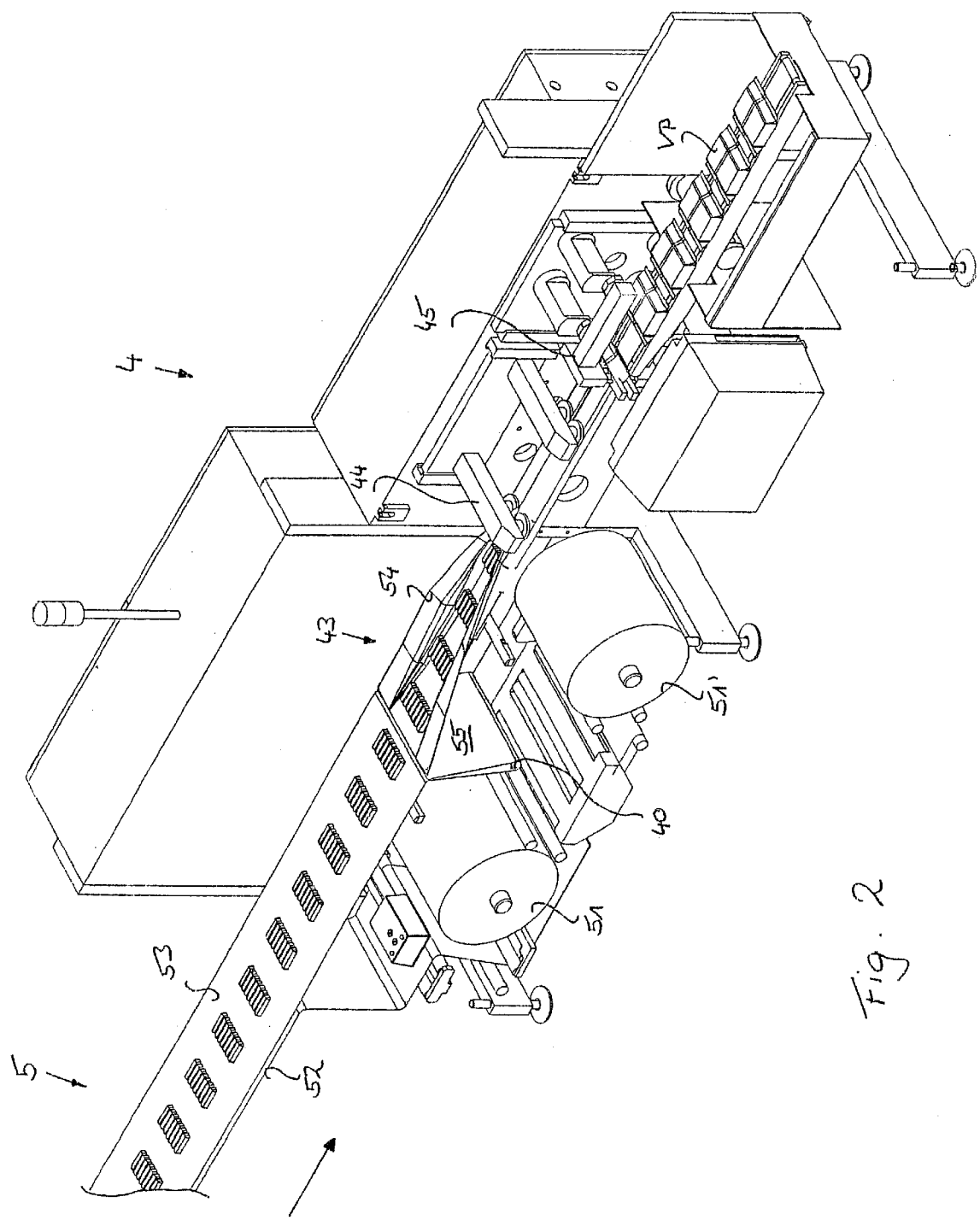
FIG. 2 shows an enlarged detail from FIG. 1.

FIG. 2 illustrates an enlarged detail of the packaging station 4 and of part of the packaging-material-web conveyer 5. The packaging-material web 50 is unrolled from a packaging-material reel 51 in which case it is conveyed, via deflecting means on the underside 52 of the packaging-material-web conveyer 5, to the start of the latter and, via at least one deflecting roller on the topside 53 of said conveyer, back to the packaging station 4. 51' designates a replacement packaging-material reel. The packaging-material-web conveyer 5 is subdivided into two sub-conveyers, the packaging-material web 50, between the two sub-conveyers, forming a loop 54 via height-adjustable deflecting means 40, for example a roller. Arranged to follow in the conveying direction, in the region of the second sub-conveyer, is a folding unit 43, for example a folding box, which folds the packaging-material web 50 upward at least on one side. In the exemplary embodiment illustrated here, the packaging-material web 50 is folded upward symmetrically on both sides. The loop formation, and/or the deflecting means 40, make/makes it possible to regulate the speed of the packaging-material feeds and the tensile stressing to which the packaging-material web 50 is subjected.

The packaging station 4, the position-detecting unit 2 and the gripping unit 3 are preferably connected to a common control means, with the result that the gripping unit 3 operates in accordance with the position-detecting unit 2 and in accordance with the functional capacity of the packaging station 4. It is also possible for the deflecting means 40 to be regulated correspondingly via the common control means.

Figure 3:
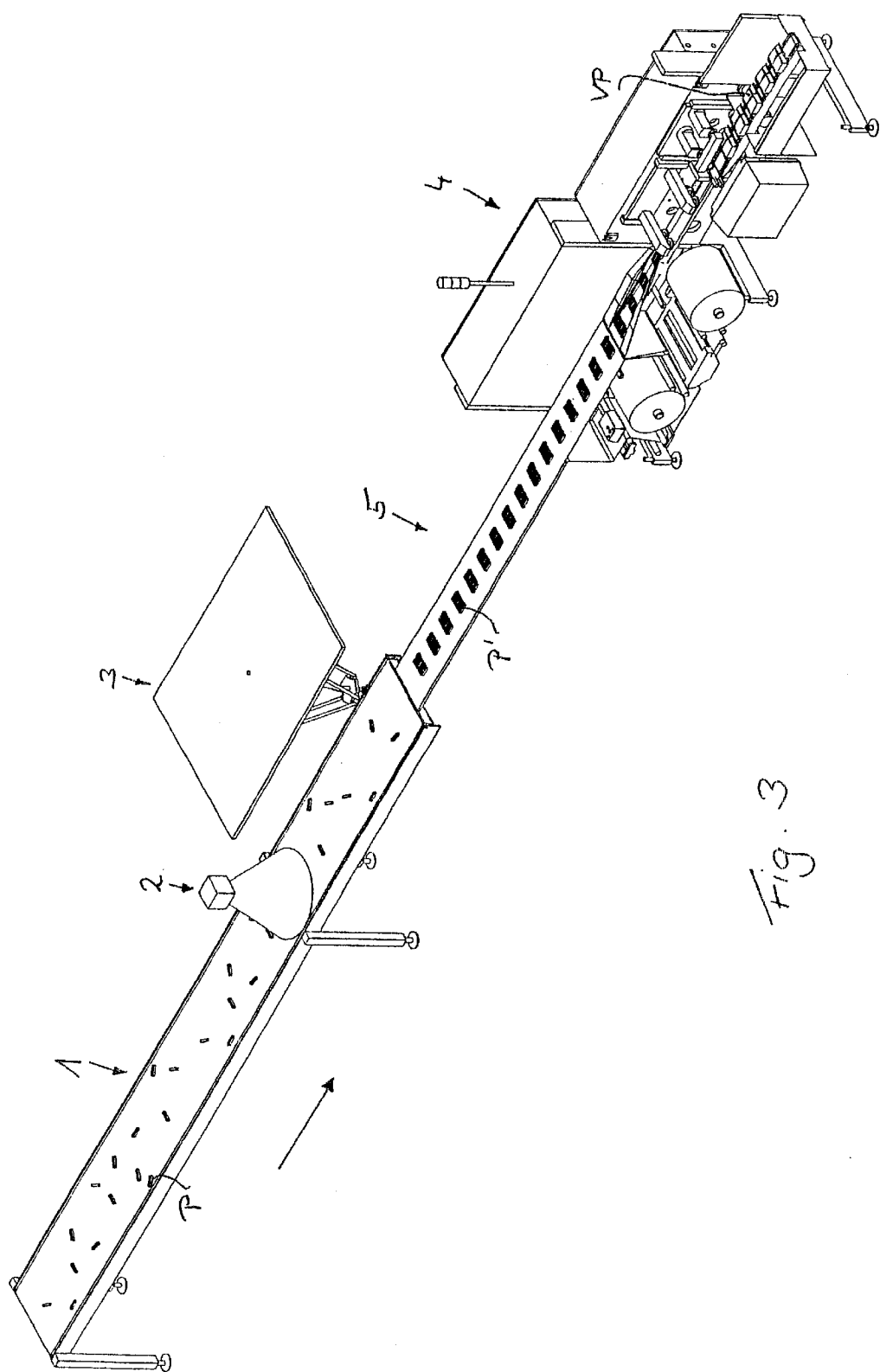
FIG. 3 shows a second embodiment of an apparatus according to the invention with a packaging station.

A longitudinal sealing unit 44, by means of which the packaging-material web 50 is provided with a top longitudinal sealing unit, follows in the conveying direction. In a following transverse sealing unit 45, the packaging-material web 50 is sealed transversely and separated into corresponding packs VP. FIG. 3 illustrates a second embodiment of the apparatus according to the invention. In this case, the packaging-material-web conveyer 5 and the feed conveyer 1 are arranged in a line in the conveying direction.

Figure 4:
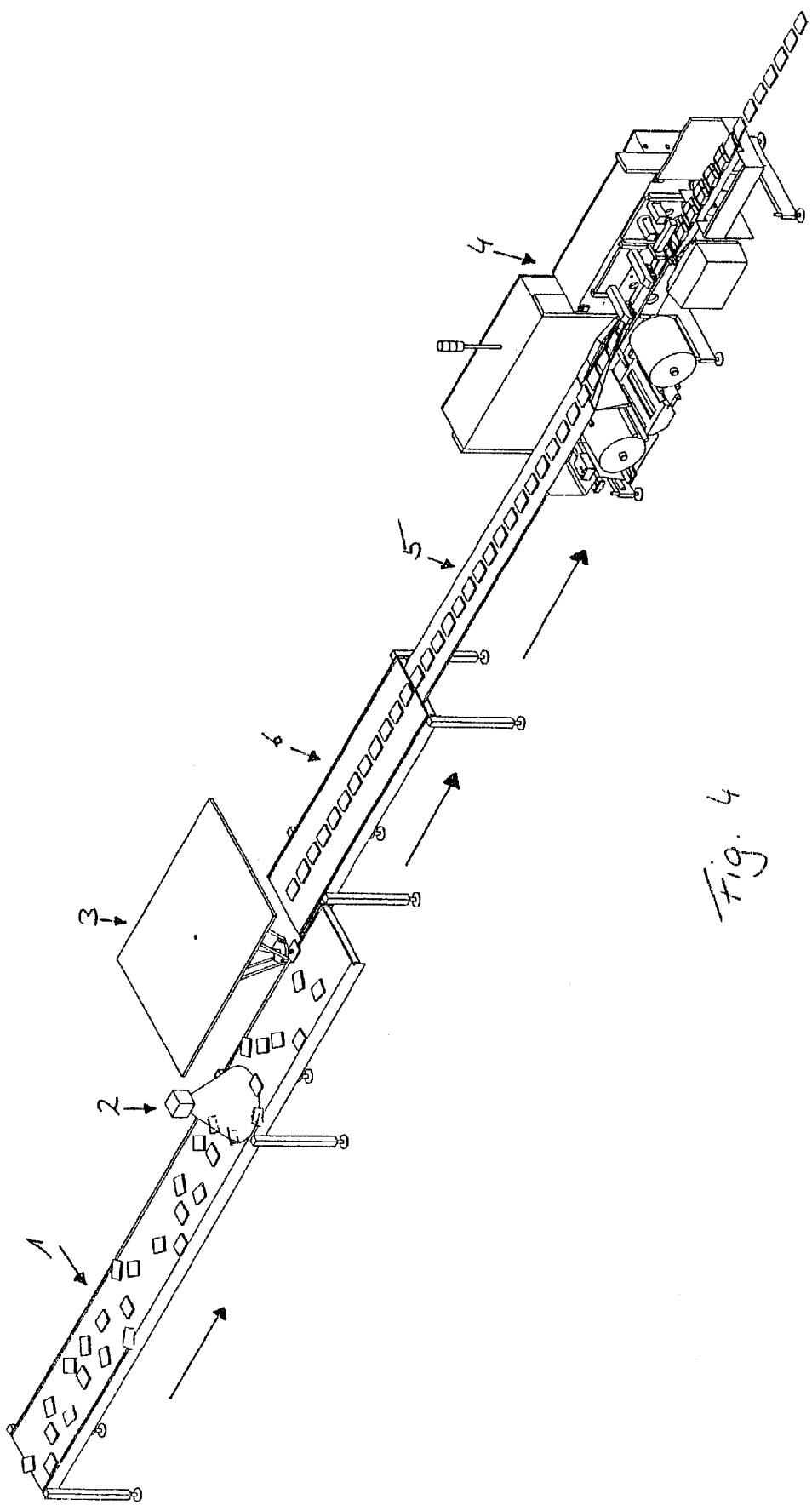
FIG. 4 shows a third embodiment of an apparatus according to the invention with a packaging station.

In the third embodiment, which is illustrated in FIG. 4, an intermediate conveyer 6 is provided between the feed conveyer 1 and the packaging-material-web conveyer 5, the gripping unit 3 depositing the piece goods P on the intermediate conveyer 6 in the position, which is predetermined for the subsequent packaging. It is preferable for that end of the bearing surface of the feed conveyer 1 which is directed toward the intermediate conveyer 6 to be aligned with the start of the bearing surface of the intermediate conveyer 6, the start of said surface being directed toward the feed conveyer 1, with the result that, here too, the transporting distance of the gripping unit 3 is minimized. The intermediate conveyer 6 and the packaging-material-web 5 are arranged in a line in the conveying direction, the packaging-material-web conveyer 5 preferably having a deflecting roller with a minimized diameter, in order that the transition from one conveyer 6, 5 to the other forms the smallest possible gap. It is also the case that the intermediate conveyer 6 has a friction factor, which avoids any undesired change in position of the piece goods during transportation.

Since the piece goods are already conveyed on the packaging-material web to the packaging station, the apparatus according to the invention allows straightforward but efficient packaging of piece goods in tubular bags.

We claim:

1. An apparatus for feeding piece goods to a tubular-bag packaging station comprising:

a feed conveyer for feeding the piece goods and a packaging-material-web conveyer for conveying a packaging-material web to the packaging station, wherein the packaging-material-web conveyer is subdivided into a first sub-conveyor portion and a second sub-conveyer portion, the packaging-material web between the first and the second sub-conveyer portions forming a loon via deflecting means for deflecting the packaging-material-web, the packaging-material web being generally flat on the first sub-conveyer portion and being processed to form tubular bags on the second sub-conveyer portion, wherein a position-detecting unit is provided for detecting the piece goods conveyed on the feed conveyer, and at least one gripping unit is provided for removing the piece goods from the feed conveyer and for depositing the piece goods directly or indirectly in a predetermined position on a section of the first conveyor portion of the packaging-material web, this section being transported towards the packaging station by the first sub-conveyer thereby carrying the goods over the loop and onto the second sub-conveyor portion where the packaging material web is processed to form tubular bags.

2. The apparatus as claimed in claim 1, wherein a folding unit is provided in order for the packaging-material web provided with the piece goods to be folded upward at least on one side, in particular on both sides.

3. The apparatus as claimed in claim 1, wherein an intermediate conveyer is provided between the feed conveyer and the packaging-material-web conveyer, the gripping unit depositing the piece goods in the above mentioned predetermined position on the intermediate conveyer.

4. The apparatus as claimed in claim 1, wherein that end of a bearing surface of the feed conveyer which is directed toward the packaging-material-web conveyer is aligned with a start of bearing surface of the packaging-material-web conveyer, the start of said surface being directed toward the feed conveyer.

5. The apparatus as claimed in claim 3, wherein that end of a bearing surface of the feed conveyer which is directed toward the intermediate conveyer is aligned with a start of a bearing surface of the intermediate conveyer, the start of said surface being directed toward the feed conveyer.

6. The apparatus as claimed in claim 1, wherein at least two gripping units are arranged one behind the other in the conveying direction.

7. The apparatus as claimed in claim 1, wherein the folding unit is arranged in the region of the second sub-conveyer.

8. The apparatus as claimed in claim 1, wherein the position-detecting unit, the gripping unit and the packaging station are connected to a common control means.

9. The apparatus as claimed in claim 1, wherein the feed conveyer or the intermediate conveyer is arranged in a line, in the conveying direction, with the packaging-material-web conveyer.

10. The apparatus as claimed in claim 1, wherein the packaging-material-web conveyer is offset in relation to the feed conveyer in the direction perpendicular to the conveying direction.

11. A method of feeding piece goods to a tubular-bag packaging station comprising:

the piece goods being fed by a feed conveyer and a packaging-material web being fed by a packaging-material-web conveyer to the packaging station, wherein the packaging-material-web conveyer is subdivided into a first and a second sub-conveyer and wherein the packaging-material web is first conveyed by the first sub-conveyer in an unfolded position, is then deflected via deflecting means into a loop and is afterwards conveyed by the second sub-conveyer to the packaging station where the web is folded about the goods to form tubular bags, and the piece goods being positioned on a section of the packaging-material web being conveyed by the first sub-conveyer before the tubular bags are formed, wherein the position of the piece goods conveyed on the feed conveyer is detected by means of a position-detecting unit, and at least one gripping unit removes the piece goods from the feed conveyer and positions them directly or indirectly, in a predetermined position required for the packaging, on said section of the packaging-material web, the piece goods being conveyed on the packaging-material web conveyed by the first sub-conveyer to the second sub-conveyor in the packaging station, where the packaging material web is processed to form tubular bags.

12. The apparatus as claimed in claim 1, wherein the packaging-material web conveyor is subdivided into two sub-conveyors, the packaging-material web, between the two sub-conveyors, forming a loop via deflecting means.

13. The apparatus as claimed in claim 3, wherein the feed conveyor or the intermediate conveyor is arranged in a line, in the conveying direction, with the packaging-material web conveyor.

14. The apparatus according to claim 1, wherein the packaging-material web forms a conveyer for conveying the piece goods.

15. The apparatus according to claim 1, wherein the packaging-material web is arranged horizontally when conveying the piece goods.

16. The apparatus according to claim 1, wherein the packaging-material web is fed from an underside of a packaging-material-web conveyer.

\* \* \* \* \*